(12) United States Patent
Jones, Jr. et al.

(10) Patent No.: US 12,299,092 B1
(45) Date of Patent: May 13, 2025

(54) COMPROMISED ENDPOINT CREDENTIALS INTERCEPTOR

(71) Applicant: Lookout, Inc., Boston, MA (US)

(72) Inventors: Frederick Jay Jones, Jr., Ayer, MA (US); Alan Phillips, Halifax, MA (US); Abhishek Madan, Milpitas, CA (US); Ben Joseph, Toronto (CA); Smit Davda, Rajkot (IN); Brian James Buck, Livermore, CA (US); Tyler Croak, Columbia, MD (US); Jasmit Singh Kochhar, Tumwater, WA (US)

(73) Assignee: Lookout, Inc., Boston, MA (US)

( * ) Notice: Subject to any disclaimer, the term of this patent is extended or adjusted under 35 U.S.C. 154(b) by 0 days.

(21) Appl. No.: 18/769,641

(22) Filed: Jul. 11, 2024

(51) Int. Cl.
  *G06F 21/31* (2013.01)
  *G06F 21/45* (2013.01)
  *H04L 9/40* (2022.01)

(52) U.S. Cl.
  CPC .............. *G06F 21/31* (2013.01); *G06F 21/45* (2013.01); *H04L 63/1408* (2013.01); *H04L 63/1433* (2013.01); *G06F 2221/2151* (2013.01)

(58) Field of Classification Search
  CPC .. G06F 21/31; G06F 21/45; G06F 2221/2151; H04L 63/1408; H04L 63/1433
  See application file for complete search history.

(56) References Cited

U.S. PATENT DOCUMENTS

| | | | |
|---|---|---|---|
| 8,099,472 B2* | 1/2012 | Mahaffey | G06F 9/54 370/254 |
| 9,077,747 B1* | 7/2015 | Chen | H04L 63/1433 |
| 9,379,896 B1* | 6/2016 | Altman | G06F 21/31 |
| 9,787,668 B1* | 10/2017 | Marathe | H04L 63/0435 |
| 10,540,493 B1* | 1/2020 | Kras | G09B 9/00 |
| 10,614,208 B1* | 4/2020 | Edwards | G06F 21/45 |
| 11,223,636 B1* | 1/2022 | Angara | H04L 9/3247 |
| 11,625,491 B1* | 4/2023 | Quevedo | G06F 21/602 713/155 |

(Continued)

OTHER PUBLICATIONS

Finding users who have not changed their password recently; Jun. 24, 2022; https://specopssoft.com/blog/finding-users-who-have-not-changed-their-password-recently/ (Year: 2022).*

*Primary Examiner* — James R Turchen
(74) *Attorney, Agent, or Firm* — Dergosits & Noah LLP; Michael E. Dergosits

(57) ABSTRACT

Real-time monitoring and alerting of breached security credentials for server-based endpoints is described herein. In various embodiments, a software component (that intercepts outgoing network traffic from a computing device) or a server-based breach monitoring component may receive a request for endpoint data. Credential data may be included in the request. The endpoint and/or the credential data may be compared to credential data linked to a list of compromised endpoints. An alert may be generated for the client device when both a match is detected with credential data of a breach object on the list of compromised endpoints and the breach time field of the breach object is after a previous credentials change for the endpoint. Access to the endpoint may be blocked and/or a change password mechanism may also be displayed to change the user credentials prior to revisiting the endpoint.

17 Claims, 9 Drawing Sheets

(56) References Cited

U.S. PATENT DOCUMENTS

| | | | | |
|---|---|---|---|---|
| 2017/0346797 | A1* | 11/2017 | Yedidi | H04L 63/14 |
| 2018/0046796 | A1* | 2/2018 | Wright | G06F 21/45 |
| 2018/0300475 | A1* | 10/2018 | Zhang | H04L 63/0272 |
| 2019/0052615 | A1* | 2/2019 | Auvenshine | H04L 63/068 |
| 2020/0059451 | A1* | 2/2020 | Huang | G06N 3/044 |
| 2020/0137096 | A1* | 4/2020 | Endler | H04L 63/083 |
| 2020/0244679 | A1* | 7/2020 | Taniguchi | H04L 61/4511 |
| 2020/0279041 | A1* | 9/2020 | Endler | G06F 21/554 |
| 2020/0304544 | A1* | 9/2020 | Vasanthapuram | H04L 63/1416 |
| 2021/0006573 | A1* | 1/2021 | Britt | G06F 21/31 |
| 2021/0136106 | A1* | 5/2021 | Balasubramaniam | H04L 63/0236 |
| 2023/0081399 | A1* | 3/2023 | Murphy | G06Q 10/06395 705/7.42 |
| 2023/0169161 | A1* | 6/2023 | Konda | G06F 21/45 726/26 |

* cited by examiner

COMPROMISED ENDPOINT CREDENTIALS INTERCEPTOR

TECHNICAL FIELD

The claimed subject matter relates generally to the field of network communications security and more specifically to providing real-time, browser-agnostic monitoring and alerting of breached security credentials for server-based endpoints, such as web sites.

BACKGROUND

User data breach is one of the most common ways used by malicious actors for cyber fraud. The data stolen from websites/apps through malware (and other mechanisms) is often sold on the dark web for malicious actors to misuse the info. Additionally, credit card and other financial info breach is also prevalent and malicious actors use similar mechanisms to sell credit card info. Although there are services or software or browser extensions that informs a user about user credentials (or credit card info) being stolen via email, text message or through other mechanisms, there is a likelihood that users may ignore or not read those alerts or messages. In such a scenario where the user does not change credentials, the malicious actors often misuse or sell this information for cyber fraud or cyberattacks. Furthermore, some types of sensitive information can be a "gateway" to breach other things. For example, if a user relied upon their user credentials for a particular web site to log into other linked web sites (in lieu of creating separate accounts for the linked web sites), then the linked web sites could as a result be breached. No conventional system tells the user in real time whether the credentials (or financial info) that they are using is already breached (or not).

SUMMARY

Methods and systems for real-time monitoring and alerting of breached security credentials for server-based endpoints are described herein. In various embodiments, a software component (that intercepts outgoing network traffic) on a client computing device or a server-based breach monitoring component may receive a request for endpoint data. Credential data may be included in a transmission to the server-based endpoint that may include credentials, either for the requested endpoint or for a different endpoint (depending on the type of credentials involved). The credential data may be compared to credential data linked to a list of compromised endpoints. The comparison may be performed, for example, by the security application comparing hash values of compromised credential data associated with the compromised endpoints provided by the dark web with hash values of the credential data included in the transmission. An alert mechanism, such as a graphical interface, may be caused to be displayed on a display (of the computing device, or of a different device in the enterprise case, for example) in response to a match being detected with a breach object on the list of compromised endpoints. In some embodiments, the alert mechanism may require additional events to be triggered, such as a timestamp comparison between a breach time and a time of the most recent credentials change associated with the requested endpoint, for example. In tandem with the alert interface being displayed, a change password interface may also be displayed on the display that includes fields that receive inputs for the user to change the user credentials before relaying the credential data to the server-based endpoint.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

Figure 1:
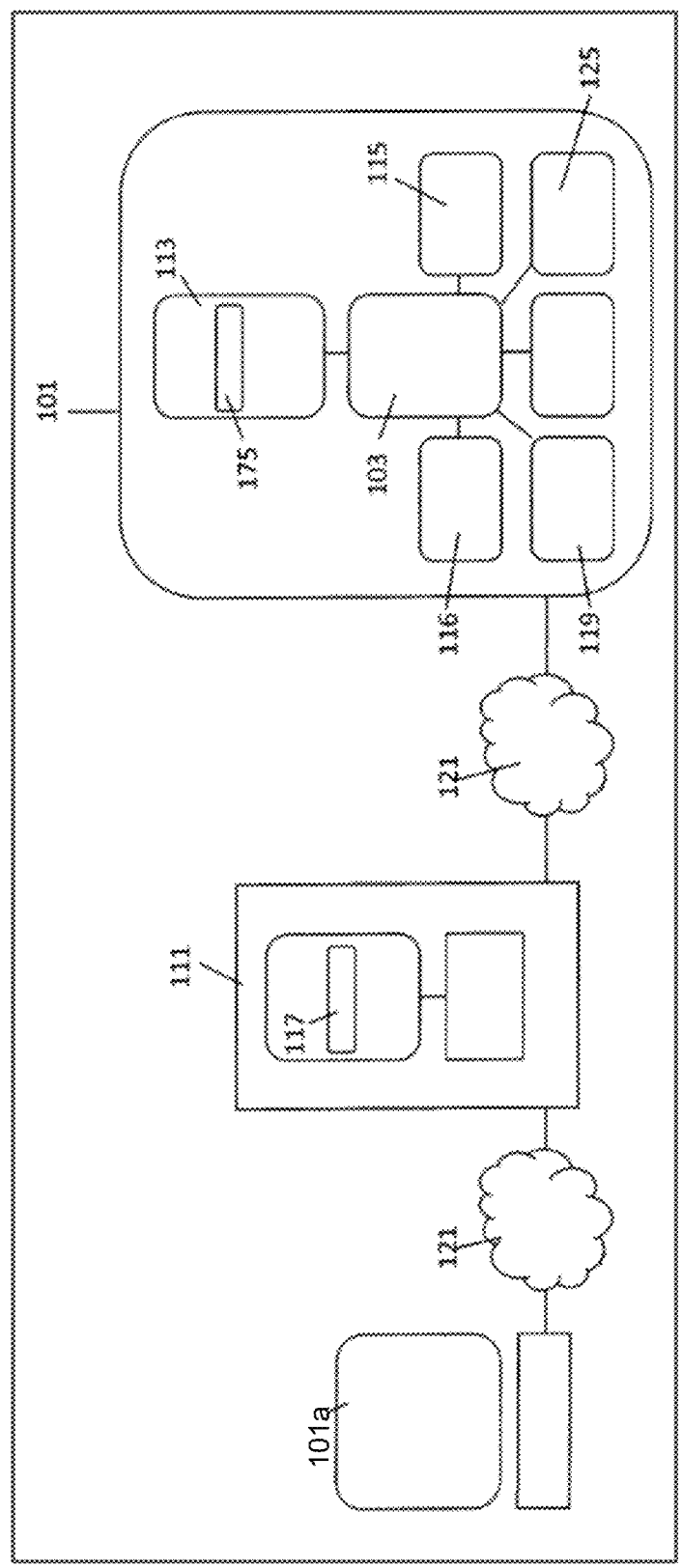
FIG. 1 illustrates a diagram of an example system for real-time monitoring and alerting of breached security credentials for server-based endpoints in accordance with some embodiments.

The solutions described herein are related to identifying breached user credentials in real time. In embodiments using a virtual private network (VPN)-based approach, loopback VPN libraries may be used to intercept and inspect all network traffic to and from the client device. The traffic is then compared to known, unresolved user account breaches. The system then alerts the user, gives them the opportunity to generate a replacement password, and helps navigate them to the appropriate site (in case the URL request does not originate from a browser application). The presented user mechanisms (such as user interfaces, for example) can direct the user to change the credentials for the affected endpoint, and the change may either be assisted (i.e. by directing the user to the proper web page for changing a password) or automated using an application programming interface (API) to the endpoint.

Different types of data that have been breached may require different types of actions to mitigate or remediate the breach. For example, for a social security number (or national ID number) there may be options to change the compromised information online, or there may be additional automated actions that can be taken with respect to other service providers who have that information. The automated actions, which may include automatically generated messages for the user to forward to the appropriate destinations to tighten controls, tighten authentication, lock credit reporting agency status, notify banks of the SSN breach, etc. In some embodiments, a standard way of sending a notification, to any service provider that already has been given that piece of breached information, that it has been breached so the service provider can take appropriate action(s) may be provided. For example, if a social security number is breached, certain embodiments may automatically send a notification of the breach to the corresponding banks that use the social security number and request that the banks take appropriate action.

The present disclosure may be implemented in numerous ways including, but not limited to, as a process, an apparatus, a system, a device, a method, or a computer readable medium such as a non-transitory computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present disclosure. Applications may also include web applications, which include components that run on the device in a web browser. In this specification, these implementations, or any other form that the disclosure may take, may be referred to as techniques. In general, the order of the steps of disclosed methods may be altered within the scope of the disclosure, except in those instances where it is specified that the order of steps must be in a particular sequence.

As used herein, the term "mobile communications device" may refer to mobile phones, PDAs and smartphones. The term "mobile communications device" may also refer to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function.

As used herein, a "mobile communications device" may also be referred to as a "device," "mobile device," "mobile client," "electronic device," or "handset." However, a person having skill in the art will appreciate that while the present disclosure refers to systems and methods being used on mobile communications devices, the present disclosure may also be used on other computing platforms including, but not limited to, desktop, laptop, notebook, netbook, or server computers.

As used herein, the term "client computer" may refer to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

Prior to describing in detail systems and methods for identifying breached user credentials, a system in which the disclosure may be implemented shall first be described. Those of ordinary skill in the art will appreciate that the elements illustrated in FIG. 1 may vary depending on the system implementation. As shown in FIG. 1, the system may include mobile communications devices 101, 101*a* and server 111. While the system 100 discusses a mobile communications device using a security component, any suitable computing device may be used to generate requests for server-based endpoint data. An example mobile communications device 101 may include an operating system 113, an input device 115, a radio frequency transceiver(s) 116, a visual display 125, and a battery or power supply 119. Each of these components may be coupled to a central processing unit (CPU) 103. The mobile communications device operating system 113 runs on the CPU 103 and enables interaction between application programs and the mobile communications device hardware components. In some embodiments, the mobile communications device 101 receives data through an RF transceiver(s) 116 which may be able to communicate via various networks including, but not limited to, Bluetooth, local area networks such as Wi-Fi, and cellular networks such as GSM or CDMA.

In some embodiments, a local software component 175 is an application program that is downloaded to a mobile communications device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. Pat. No. 8,099,472, entitled "SYSTEM AND METHOD FOR A MOBILE CROSS-PLATFORM SOFTWARE SYSTEM," incorporated herein by reference. In another embodiment, the local software component 175 can be device, platform or operating system specific.

The mobile communications device 101 may access a communications network 121 that permits access to a server 111. The server 111 may also be accessed by another mobile communications device 101*a* via network 121. The network 121 will normally be the Internet but can also be any other communications network. Alternatively, the mobile communications device 101 may access the server 111 by a different network than the network the other mobile communications device 101*a* accesses the server 111. In some embodiments, the server 111 is provided with server software 117. The server software 117 on the server 111 provides functionality to allow two-way communication between the server 111 and the mobile communications devices 101, 101*a* through the network 121. The server software 117 allows data, such as location-related information, pictures, contacts, videos, SMS messages, call history, event logs, and settings to be transferred from the mobile communications device 101 to the other mobile communications device 101a and vice versa.

It is understood by those of ordinary skill in the art that the functionality performed by server 111 does not necessarily have to be accomplished on a single hardware device. In this context, the use of the term server is intended to refer to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality. S3 (simple storage system), from Amazon, Inc. is such a data storage service which may be utilized by separate set of computers to enable the present invention.

It should be understood that the arrangement of electronic mobile communications device 101 illustrated in FIG. 1 is but one possible implementation and that other arrangements are possible. It should also be understood that the various system components defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile communications device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the disclosure described herein can be embodied in many different variations, and all such variations known to those of ordinary skill are contemplated to be within the scope of what is claimed.

In the description that follows, the disclosure will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the disclosure is being described in the foregoing context, it is not meant to be limiting as those of skill in the art will appreciate that various of the acts and operation described hereinafter may also be implemented in hardware.

Figure 2:
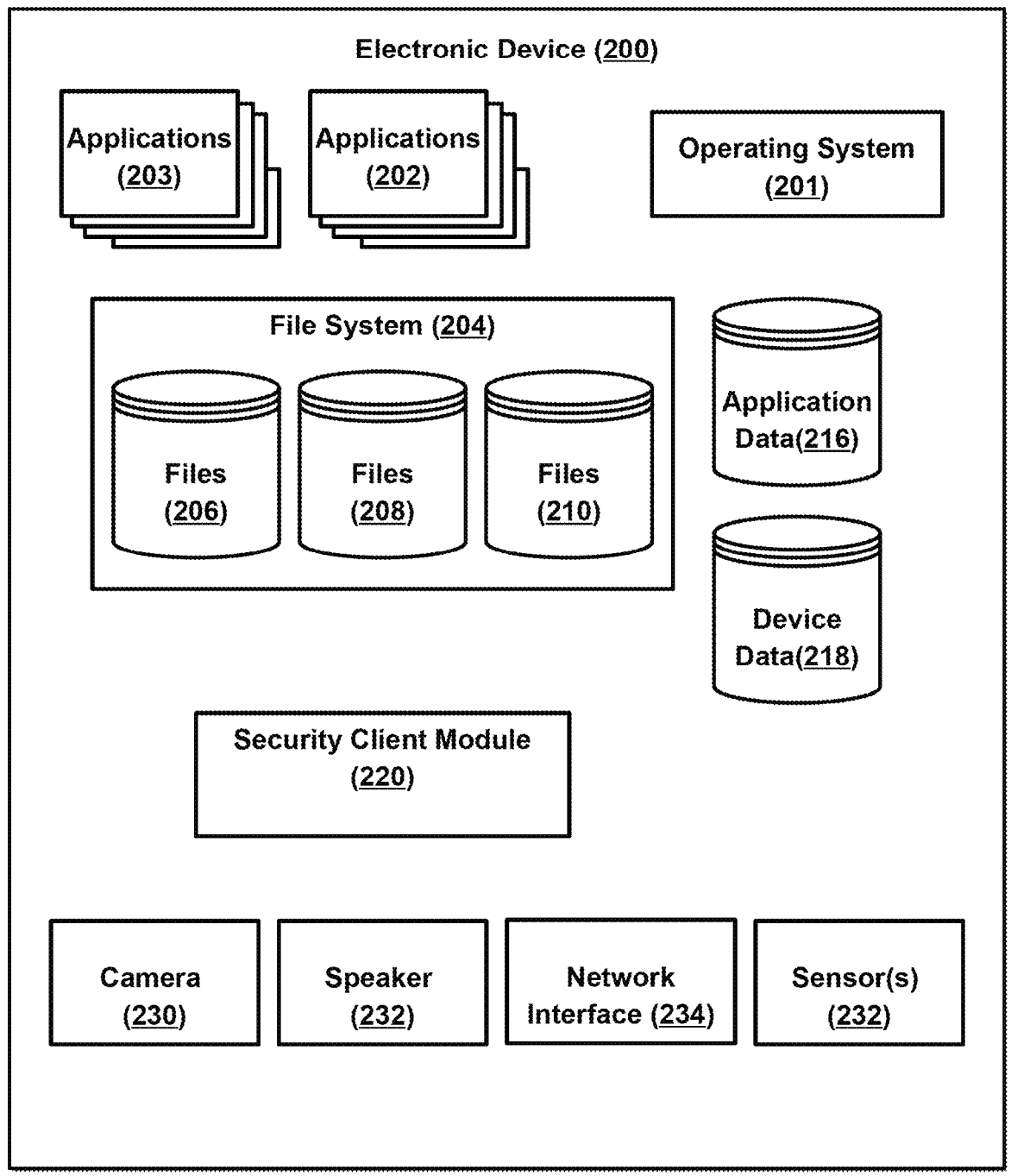
FIG. 2 illustrates a block diagram of an electronic device in accordance with some embodiments of the disclosure.

FIG. 2 illustrates a block diagram of an electronic device 200 in accordance with some embodiments of the disclosure. As shown in FIG. 2, the electronic device 200 may be configured to provide an execution environment to host at least one operating system 201, a plurality of applications 202 and 203, and a file system 204. In some embodiments, each of the plurality of applications 202 and 203 may include executable code, which when executed by a processor (e.g., CPU 103), may provide a service or function of the electronic device 200. Each of the plurality of applications 202 or 203 may be associated with at least a part of the application data 216.

In the same or alternative embodiments, one or more of the plurality of applications 202 or 203 may access any of the file system 204 comprising file sources 206, 208, and 210, application data 216, device data 218, camera 230, speaker 232, network interface 234, and sensor(s) 232. For example, the electronic device 200 may host or run a plurality of applications 202 and 203. A first application may access or retrieve data from application data 216 and file source 206 from the file system 204. A second application may access or retrieve data from the device data 218 and file sources 208 and 210 from the file system 204. Furthermore, a third application may retrieve data generated from the camera 230 and sensor(s) 232 and access the network interface 234. As such, each of the applications of the plurality of applications 202 and 203 may access various types of data or files stored on the electronic device 200 as well as a functionality (e.g., camera 230, speaker 232, network interface 234, sensor(s) 232) of the electronic device 200. In some embodiments, the electronic device 200 may also support the operation of a security client module 220 that may be responsible for creating and assigning policies for the electronic device 200. In some embodiments, the security client module 220 may operate in the electronic device 200 as a client application hosted by the electronic device 200, as is shown in FIG. 2. In an alternative embodiment, the security client module 220 may be provided by and integrated within the operating system 201 of the electronic device 200. In either of the embodiments, the security client module 220 may be configured to manage the creating and applying of policies regarding user credential breaches as described herein. In another embodiment, the security client module 220 may operate on a server in communication with the electronic device 200.

Figure 3:
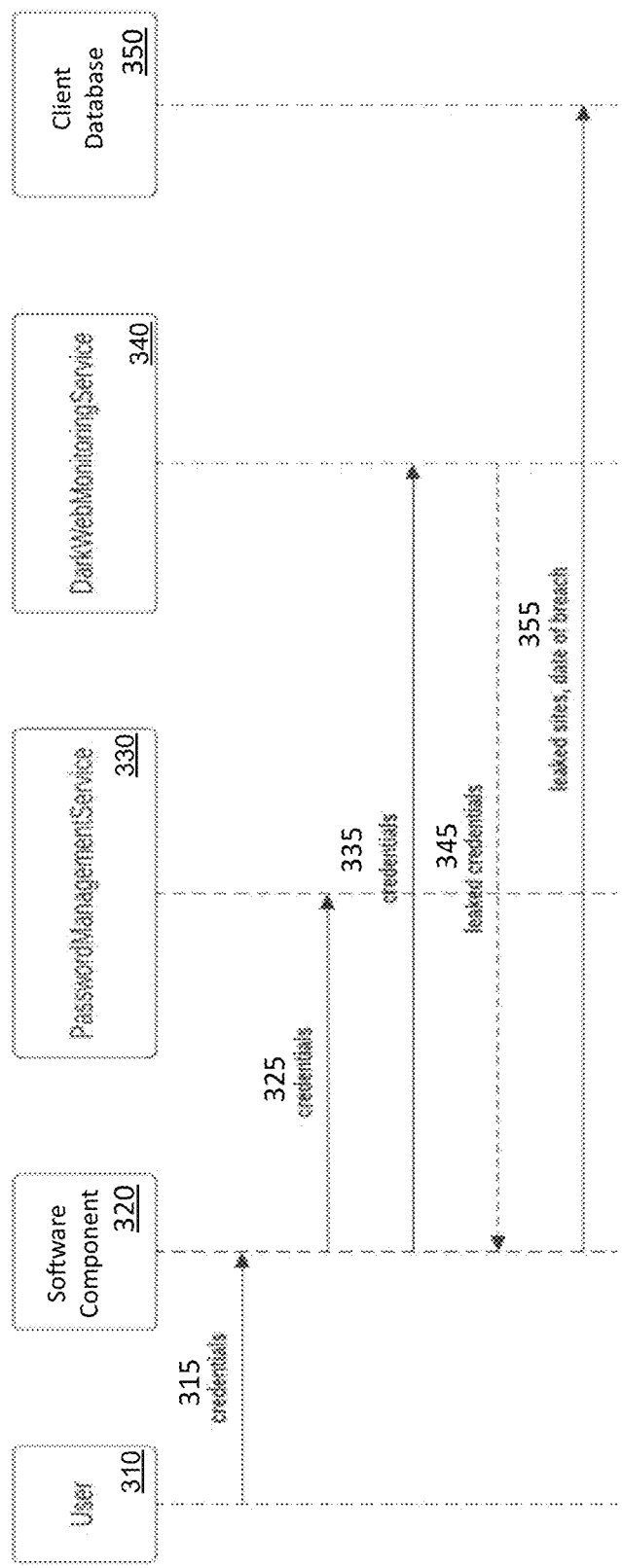
FIG. 3 illustrates a block diagram of a system for software-based real-time monitoring and alerting of breached security credentials for server-based endpoints in accordance with some embodiments.

FIG. 3 illustrates a block diagram of a system 300 for real-time monitoring and alerting of breached user security credentials for server-based endpoints in accordance with some embodiments. Exemplary system 300 includes a client computing device having a software component 320 (which may be implemented as security client module 220) in communication with password management service 330. The software component 320 may be implemented as a software agent executing on the client computing device in some embodiments, in addition to being a stand-alone application or a built-in component to an operating system, for example. The password management service 330 may also be implemented on the client device, either as an application or as part of the operating system in some embodiments. The password management service 330 and the software component 320 may be integrated together as well in some embodiments, as modules of a single application. In other embodiments, the password management service 330 may be implemented as a server-based application in communication with the software component 320 via a network connection.

As shown in system 300, a user 310 may provide credential data 315 to the software component 320, usually as part of a transmission to a web site or other server-based endpoint (e.g., during login process for the endpoint). For some sites or applications, the credential data 315 may be automatically passed, without requiring further user intervention, upon access to the site. The credentials within the credential data 315 may have a classification being selected from a site password type, a personal information type, and a financial information type. While the site password user credentials generally correspond to the requested web site, personal information (e.g. social security number, or other government identification numbers) or financial information (e.g., credit card numbers, payment application login information) correspond to different web sites from the endpoint the transmission is intended to be transmitted to. Personal information-type credentials may include any sensitive user-related information, including medical or healthcare data, business-related sensitive information (e.g., information pertaining to intellectual property), or any other personal documents of a sensitive nature. Other types of data may include Personal Identifying Information (PII), Protected Health Information (PHI), and Payment Card Industry (PCI) data, all of which are examples of personal information data used to conduct business in a way that ensures the safety and sensitivity of the personal information of the data owner. Financial information may further include password or key information related to financial web sites, such as bank numbers, cryptocurrency key or account data, and the like. While method 300 discusses the user credentials being for a web site, any server-based endpoint that authenticates users based on user credentials may be monitored for breach in similar ways. Furthermore, the credentials may be for the user requesting the endpoint data, or may be credentials known to the client device (such as a family member's credentials, for example).

Upon receipt of the credential data 315 for the endpoint, the software component 320 may retrieve a list of compromised credentials from dark web monitoring service 340. Dark web monitoring service 340 may maintain a current list of endpoints that have been compromised in some way, including any form of data privacy violation that might compromise the user credentials, that includes a list of compromised credentials for the compromised endpoints. Endpoints may be compromised in a variety of different ways, including, for example, by data theft from the endpoint or hacking of at least a portion of user credential data for the endpoint that has been compromised. Dark web monitoring services 340 may also maintain a list of credentials that are breached associated with the respective compromised endpoint.

In response to receiving the user credentials 315 and the web site identifier, information from the dark web monitoring service 340 may be used by the software component 320 to perform a comparison of the requested web site and/or the associated credential data to determine if there is a match with credential data associated with any active and/or recent breached web sites. In some embodiments, the list of endpoints may be cached by the software component 320. The dark web monitoring service 340 may periodically push an updated list of compromised endpoints (and the associated compromised credentials in some embodiments) to the software component 320, or the software component 320 may poll the dark web monitoring service 340 at predetermined time intervals.

When the requested web site associated with the user credentials 315 matches a breach object on the list of compromised endpoints, the dark web monitoring service 340 may transmit a message 345 to the software component 320 stating that there is a possibility of the user credentials having been leaked or compromised. A breach object can, for example, include a combination of user login information and password to login for account access at a bank's website and the approximate date of the breach of the web site. If the bank's website is breached and login information and passwords from the bank web site are available on the dark web, the dark web monitoring service may provide this breach object information to the software component 320 via the list of compromised endpoints. Then, further in response to receiving the request to access the web site associated with the credential data, the software component 320 may compare a date of the web site breach (which is included in the message 345 and retrieved from the list of compromised endpoints maintained by the dark web monitoring service 340) with a timestamp of the most recent change of the user credentials. The timestamp of the most recent change of the user credentials may be maintained by software component 320, the password management service 330, or a separate client database 350 in various embodiments. When a separate client database 350 is used to track user credential changes, a message 355 may be sent to the client database 350 that includes the identifier of the breached web site and the date of the breach to permit a comparison to the timestamp of the most recent change of user credentials for the endpoint in question.

Figure 4:
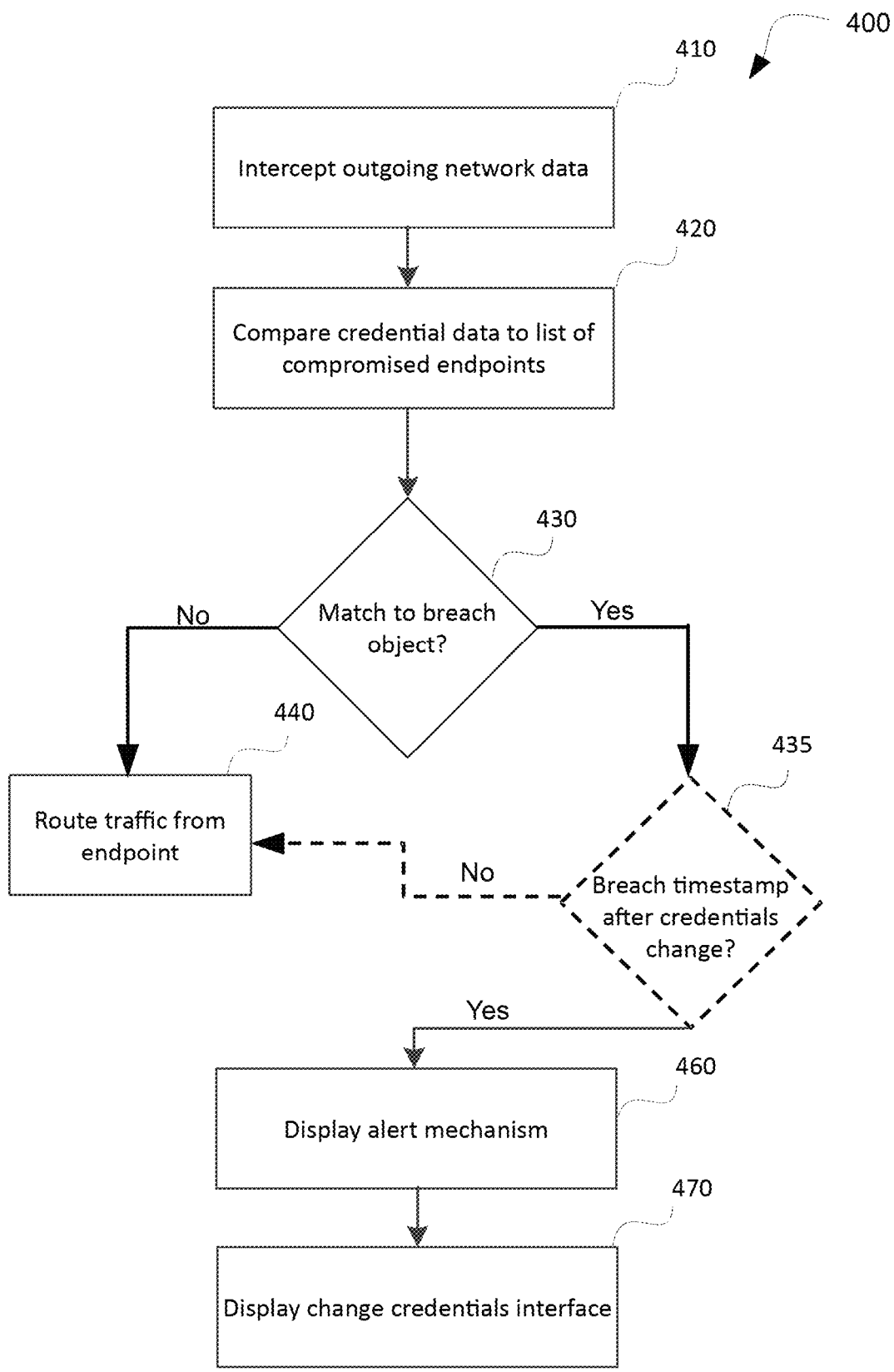
FIG. 4 illustrates a flow diagram of an example method of providing software-based real-time monitoring and alerting of breached security credentials for server-based endpoints in accordance with some embodiments.

FIG. 4 illustrates a flow diagram of an example method 400 of providing real-time monitoring and alerting of breached security credentials for server-based endpoints in accordance with some embodiments. Method 400 may be implemented using system 300, and exemplary components of system 300 performing the steps of method 400 are described herein. At step 410, software component 320 intercepts outgoing network traffic from the client device that includes a request for web site data and a reference to user credentials. In some embodiments, this reference may be credential data included in the intercepted transmission to the web site, that may also include the user credentials to access the web site. In some embodiments, the user credentials may have been previously transmitted to the web site, leaving the user in a state of being logged in at the time the credential data is intercepted.

The credential data may be compared to credential data linked to a list of compromised endpoints at step 420. As shown in system 300, this may be done by the software component 320, the password management service 330, or the client database 350. The list of compromised endpoints and the associated compromised credential data may be maintained by a dark web monitoring service 340 in communication with the software component 320 via a network connection. The list of compromised endpoints may include breach objects, which may each identify the compromised endpoint, include a date of breach (when the dark web monitoring service 340 became aware of the breach) and the compromised credentials associated with the compromised endpoint. At decision block 430, the software component determines if there is a match of the credential data (which may be for either the requested web site or any other web site associated with the user credentials) to credential data linked to any breach object on the list of compromised endpoints.

In some embodiments, the comparison is performed by the software component 320 first encrypting the credentials within the credential data using any suitable encryption mechanism (e.g., SHA 256 with salt) to obtain a hash of the transmitted credentials. The software component 320 may then encrypt the compromised credentials within the breach object of the compromised endpoint associated with the transmitted credentials using the same encryption mechanism used to encrypt the transmitted credentials. As discussed above, the breach object may be an entry on the list of compromised endpoints received from dark web monitoring service 340, and may be linked by the security component 320 determining which endpoints are associated with the transmitted credentials (there may need to be multiple comparisons when the transmitted credentials are associated with multiple endpoints). The security component 320 may then compare the hashes of the transmitted credentials and the compromised credentials to see if there is a match. When no match is identified, the request for web site data, including the user credentials, may be routed to the web site at step 440.

After the determination that the credential data matches credential data linked to a breach object on the list of compromised endpoints is made, a timestamp for the time the breach was detected by the dark web monitoring service 340 may be retrieved and compared to a timestamp corresponding to the most recent previous user credentials change was made for the compromised endpoint at optional block 435. The comparison, using the leaked site/credential data and date of breach 355 (received from the dark web monitoring service 340) and the timestamp corresponding to the most recent previous user credentials change for the breached web site, may be performed by software component 320 or any other suitable component, as described above.

An alert mechanism may then be caused to be displayed on a display at step 460 in response to a match of credential data for either the requested web site or the web site associated with the user credentials to any breach object on the list of compromised endpoints. The alert mechanism may take the form of an interface with fillable fields to receive credential changes, such as a new password for the server-based endpoint, displayed on a display. The display may be the display of the client device, or a different display (e.g., when the request is transmitted by a server lacking a display, for example). Other alert mechanisms may entail using a call-back using the software development tools of an application, for example. In embodiments where timestamp comparison is performed, the timestamp comparison indicating that the breach time field of the breach object has taken place after the most recent previous credentials change associated with the breached web site may cause the alert mechanism to be caused to be displayed. Along with the alert mechanism being displayed, a change password interface may also be displayed on the display by the mobile client 320 that includes fields that receive inputs for the user to change the user credentials before relaying the credential data to the web site at step 470. In addition to the requested web site, a web page or web application associated with the change user credentials interface may be identified based on the classification of the user credentials (e.g., site password, personal information, financial information, etc.), which may be useful for personal information or financial information user credentials. Furthermore, together with the password management service 330, in some embodiments a list of web sites where the user credentials associated with the breached web site have been previously used may be retrieved in response to both (1) the comparing the user credentials resulting in the match with credential data linked to the list of breached user confidential information and (2) the timestamp comparison indicating that the breach time field of the breach object is after the previous credentials change associated with the web site. This may protect the user where the same user credentials are used for multiple web sites, for example.

Figure 5:
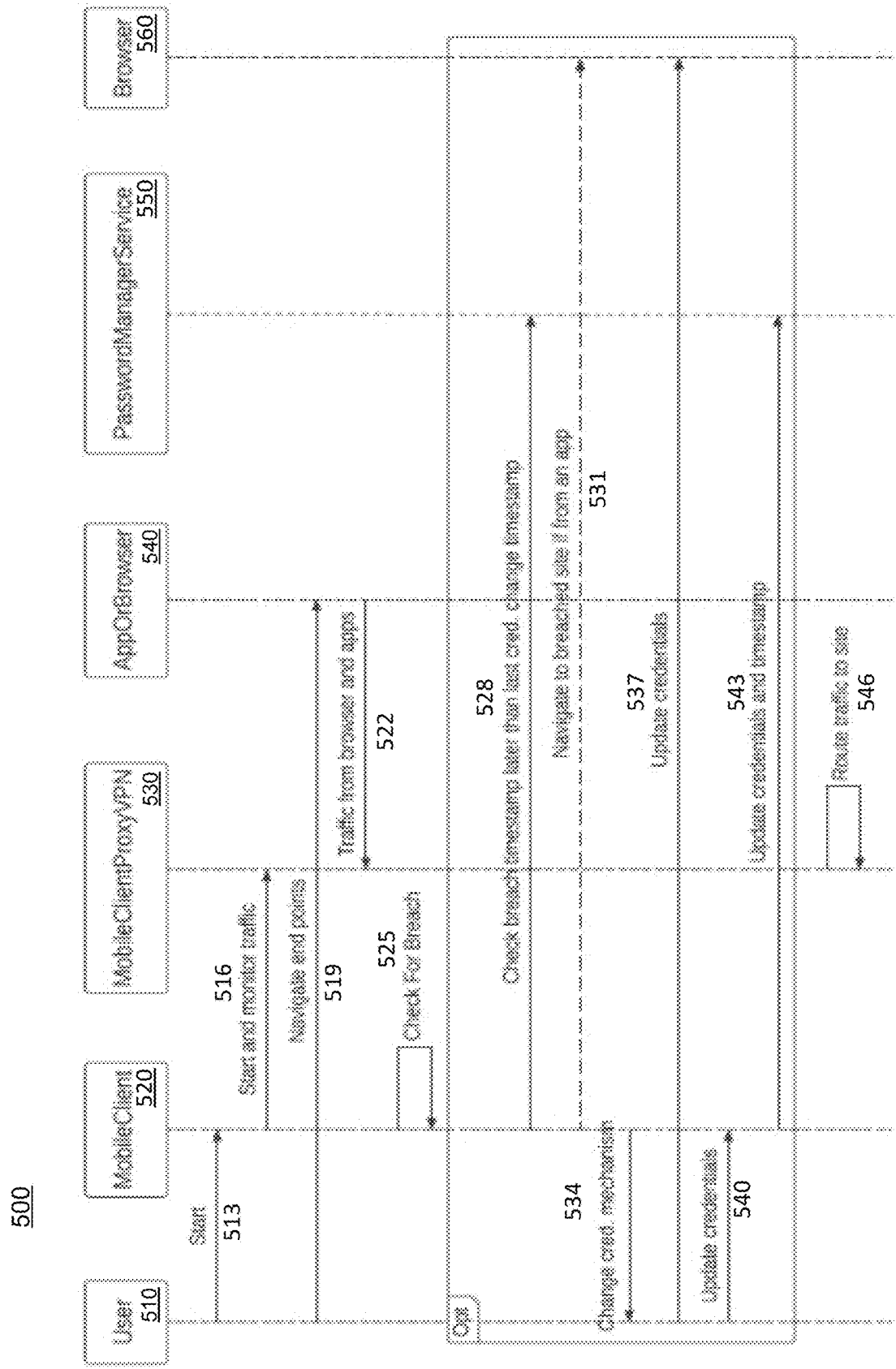
FIG. 5 illustrates a block diagram of a system for VPN-based real-time monitoring and alerting of breached security credentials for server-based endpoints in accordance with some embodiments.

FIG. 5 illustrates a block diagram of a system 500 for real-time monitoring and alerting of breached security credentials for server-based endpoints using a VPN to implement the monitoring and protection of credentials in accordance with some embodiments. The exemplary system 500 includes a client device having a mobile client 520 (which may be implemented as security client module 220, similar to software component 320) in communication with password management service 550. The password management service 550 may be implemented on the client device, either as an application or as part of the operating system in some embodiments. The password management service 550 and the mobile client 520 may be integrated together as well in some embodiments, as modules of a single application. In other embodiments, the password management service 550 may be implemented as a server-based application in communication with the mobile client 520 via a network connection.

Mobile client 520 may also be in communication with mobile client proxy virtual private network (VPN) 530. The mobile client proxy VPN 530 may intercept all outgoing network traffic from the client device, including requests for web site data from application or web browser 540 providing requested web site data to the client device. Mobile client proxy VPN 530 may be implemented on the client device as a standalone application or module, or may be implemented on a server in communication with the client device via a network connection. While any suitable VPN mechanism may be used in system 500, in some embodiments a loopback VPN may be used to intercept the outgoing network traffic.

As shown in system 300, a user 310 may provide inputs 513 to activate the mobile client 520 and have interactions 519 with server-based endpoints via application or web browser 540. Traffic with the web sites 522 is routed to and monitored by the mobile client 520 via proxy VPN 530. In the meantime, the mobile client 525 periodically checks (with the dark web monitoring service, not shown, for example) at predetermined time intervals (via polling or push notifications, for example) for new breach incidents on the endpoints from which web site data is being requested by the application/web browser 540.

Figure 6:
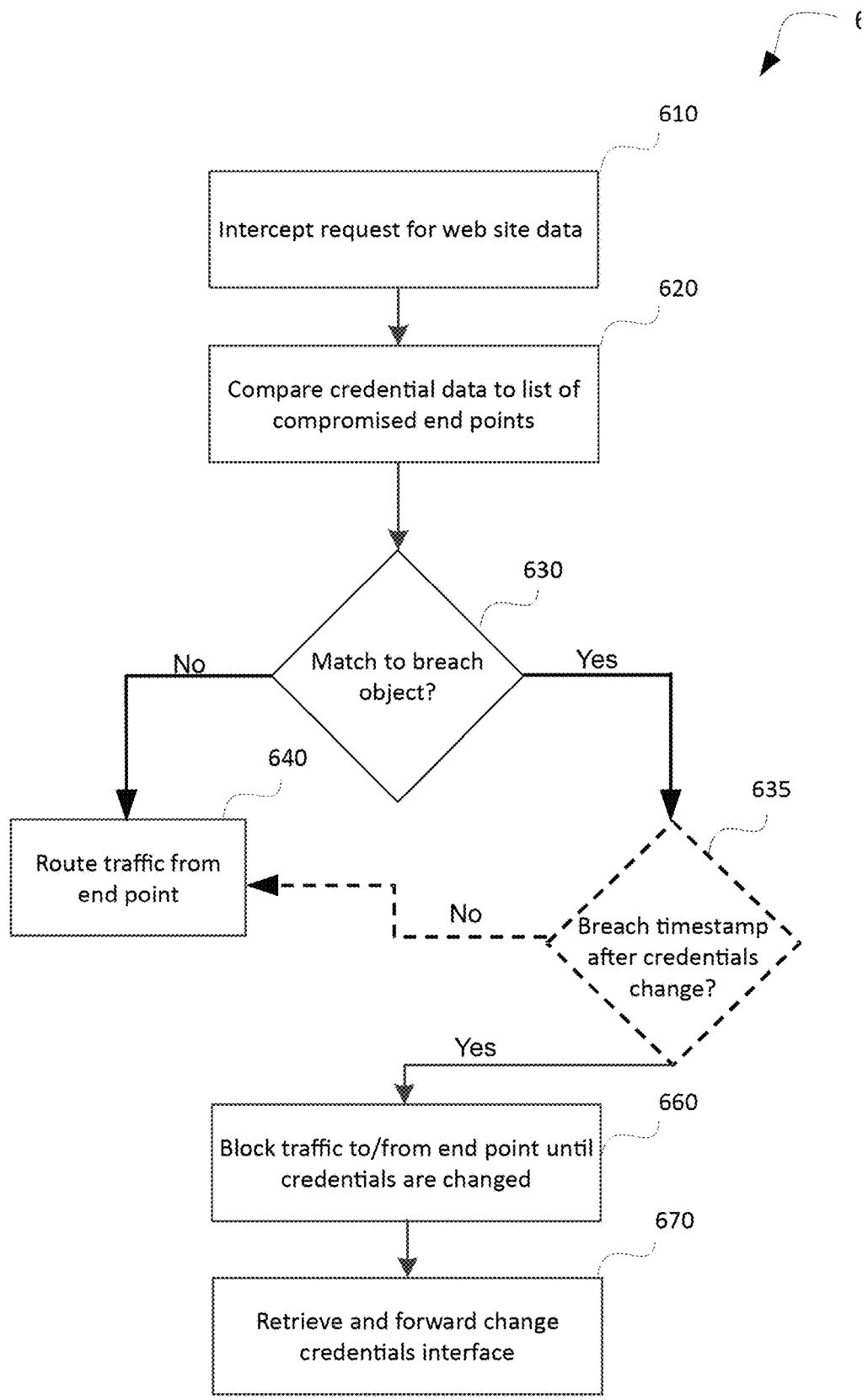
FIG. 6 illustrates a flow diagram of an example method of providing VPN-based real-time monitoring and alerting of breached security credentials for server-based endpoints in accordance with some embodiments in accordance with some embodiments.

If a match is found between either the requested web site or a web site associated with the user credentials being transmitted, then system 500 takes measures to ensure the risk of the user credentials being compromised is reduced. FIG. 6 illustrates a flow diagram of an example method 600 of providing real-time monitoring and alerting of breached security credentials for server-based endpoints using a VPN in accordance with some embodiments. Method 600 may be implemented using system 500, and exemplary components of system 500 performing the steps of method 600 are described herein. At step 610, the mobile client proxy VPN 530 intercepts outgoing network traffic from the client device that includes a request for server-based endpoint data (e.g., from a web site), and a reference to credentials for the requested endpoint or credentials associated with a different web site or service (such as financial data or personal identification data) as described above. In some embodiments, the reference to the credentials may be within credential data included in the intercepted transmission to the endpoint. The credential data for the requested endpoint and/or the endpoint associated with the user credentials may be compared to credential data linked to a list of breached web sites at step 620 by the mobile client 520. At decision block 630, the mobile client 520 determines if there is a match of the credential data for either the requested endpoint or the web site associated with the user credentials to credential data linked to any breach object on the list of compromised endpoints (during checking step 525, for example). When no match is identified, the request for endpoint data may be routed to the web site at step 640 (also reflected by mobile client proxy VPN 530 routing through traffic to the requested web site at step 546).

After the determination that the credential data for the requested endpoint and/or the endpoint associated with the credentials matches credential data linked to a breach object on the list of compromised endpoints, a timestamp for the time the breach was detected may optionally be retrieved by mobile client 520 and compared to a timestamp corresponding to the most recent previous credentials change was made for the compromised endpoint at block 635 (and at 528 via the credential change monitoring service 550, which stores credential change data for the monitored web sites). The credential change monitoring service 550, which may be a password manager service in some embodiments (or may be separate from the password manager service), may perform or implement the credential changes when the endpoint is identified as being compromised. In response to the timestamp comparison indicating that the breach time field of the breach object has taken place after the most recent previous credentials change associated with the breached web site, the mobile client 520 may block traffic to or from the requested web site until the credentials associated with the compromised endpoint are changed at step 660.

At step 670, a change credentials mechanism may be retrieved and caused to be displayed by the mobile client 520. In some embodiments, the change credentials mechanism may be a user interface that includes fields that receive inputs for the user to change the credentials for the compromised endpoint, a file including updated credential data (e.g., username/password data), or some other automated method. This may be done, for example, by the mobile client 520 causing the browser application 560 on the client device to be navigated to the breached web site via communication 531, and forwarding the secure credentials change mechanism (usually a dedicated web page interface from the breached web site) via communication 534, which is displayed to the user. While automatic credentials change interfaces are one mechanism that may be utilized, others may include a message requesting that the user independently locate the relevant change credentials form or contact an administrator or authority to assist in changing the credentials, providing the user with a link to the password change web page associated with the compromised endpoint, or any other suitable form of guidance or assistance. When the client device receives the updated credentials via user input, the client device may update the credentials via the browser and the mobile client 520 via communications 537 and 540 respectively. The mobile client 520 may, in response to receiving the updated credentials, transmit the updated credentials and the timestamp of receiving the updated credentials to the credential change monitoring service 550 for use in future breach monitoring. Finally, after the updated credentials have been received, the mobile client proxy VPN 530 may route traffic to the site, including the updated credentials, at step 546.

Figure 7:
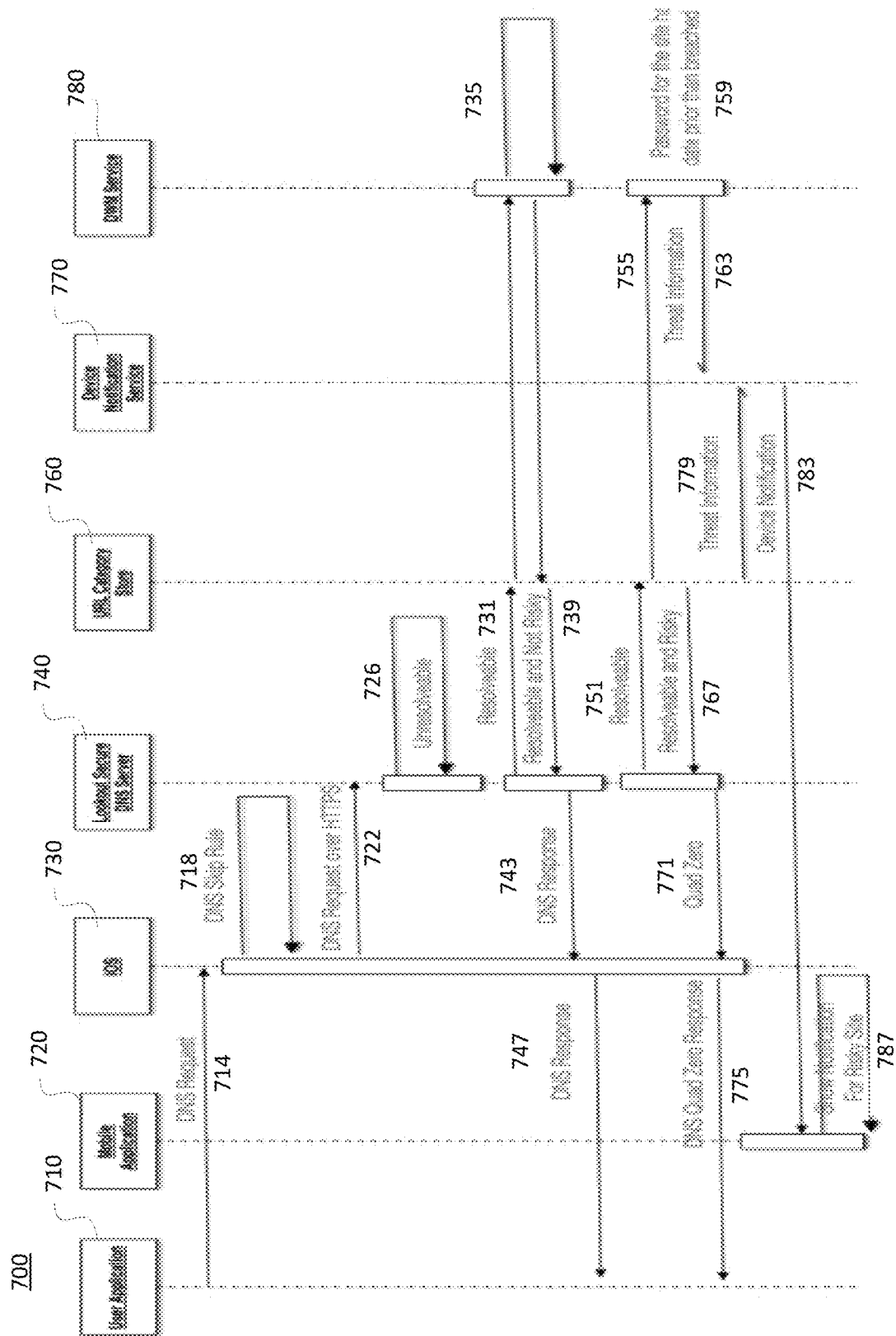
FIG. 7 illustrates a block diagram of a system for client-side real-time monitoring and alerting of breached security credentials for web sites integrated with a DNS server in accordance with some embodiments.

In addition to the foregoing, the server-side embodiments of monitoring and alerting of potentially breached user credentials may also be used with a domain name system (DNS) server to provide additional protection against breach. FIG. 7 illustrates a block diagram of a system 700 for server-side real-time monitoring and alerting of breached security credentials for server-based endpoints integrated with a DNS server in accordance with some embodiments. The exemplary system 700 includes a client device having a mobile client 720 (which may be implemented as security client module 220, similar to mobile clients 320 and 520) in communication with client device operating system 730. The client device operating system 730 and the mobile client 720 may be integrated together in some embodiments, or mobile client 720 may be implemented separately as an application.

Mobile client 720 may also be in communication with secure DNS server 740, which is in communication with the client device via a network connection. The secure DNS server 740 may intercept all outgoing network traffic from the client device via client device operating system 730, including requests for endpoint data from application or web browser 540 in a similar manner to the mobile client proxy VPN 530 in system 500. Secure DNS server 740 may work with URL category store 760 to identify which requested domains are known to be resolvable and secure and which requested domains are known to have elevated risk of being breached. Each time a domain is visited by the client device, the URL category store 760 check the status of the domain (e.g., using dark web monitoring service 780, which may be substantially similar to service 340 in system 300) to confirm that the domain has not been breached.

As shown in systems 300 and 500, a user may, using application or browser 310, provide a DNS request 714 for endpoint data to the client device operating system 730. The operating system 730 may apply DNS skip rule 718 for domains that are on the same local network as the client device in some embodiments. For Internet-based domains, the operating system 730 may forward the request for web site data to the secure DNS server 740. The secure DNS server 740 may then attempt to resolve the domain associated with the requested web site data. When the domain is unresolvable at determination 726, the DNS response 747 may inform the requesting client device that the secure DNS server 740 was unable to resolve the associated domain. When the domain is resolvable, the mobile client 720 determines whether or not the credential data for the requested endpoint associated with the domain matches credential data linked to any breach entries in the list of compromised endpoints maintained by the dark web monitoring service 780.

Credential data for the requested endpoint and/or the endpoint associated with the credentials referenced by the credential data may be compared to credential data linked to a list of breached web sites by the dark web monitoring service 780 in response to the secure DNS server 740 forwarding the resolvable requested domain via communications 731 or 751. When no match is identified, or when the request for endpoint data, including the user credentials, may be identified as being not risky in communication 739, and routed to the client device as DNS response 743 (which may then be rendered on the display of the client device using DNS response data 747).

After the determination that the credential data for the requested endpoint and/or the endpoint associated with the user credentials matches credential data linked to a breach object on the list of compromised endpoints, a timestamp for the time the breach was detected is retrieved by the mobile client 720 from data received from dark web monitoring service 780, and compared to a timestamp corresponding to the most recent previous user credentials change was made for the breached web site at processes 735 and 759. When the credentials are not included in the DNS request (or the client device is not logged into the endpoint using previously-submitted credentials), or the timestamp for the most recent previous user credentials change is after the breach timestamp, then the domain is identified as not being risk in communication 739, and eventually displayed on the client device display using response data 747. In response to the timestamp comparison indicating that the breach time field of the breach object has taken place after the most recent previous credentials change associated with the breached web site, the mobile client 720 may block traffic to or from the requested web site until the user credentials are changed. To do so, in response to receiving the notification 767 that the requested domain is resolvable and risky, the secure DNS server 740 may generate quad zero response 771, which may then be forwarded as DNS quad zero response 775 to the client device.

An alert mechanism may then be caused to be displayed on a display of the client device by the mobile client 720 in response to the timestamp comparison indicating that the breach time field of the breach object has taken place after the most recent previous credentials change associated with the breached web site. In the exemplary embodiment shown in system 700, this may be done by the URL category store transmitting the breach threat information to device notification service 770. The device notification service 770 may convert the threat information 779 into an alert interface, and transmit it to the mobile client 720 as device notification 783. After receiving the alert, the mobile client 720 may, in addition to displaying the alert interface, take the user to a change user credential web site at process 787.

Figure 8:
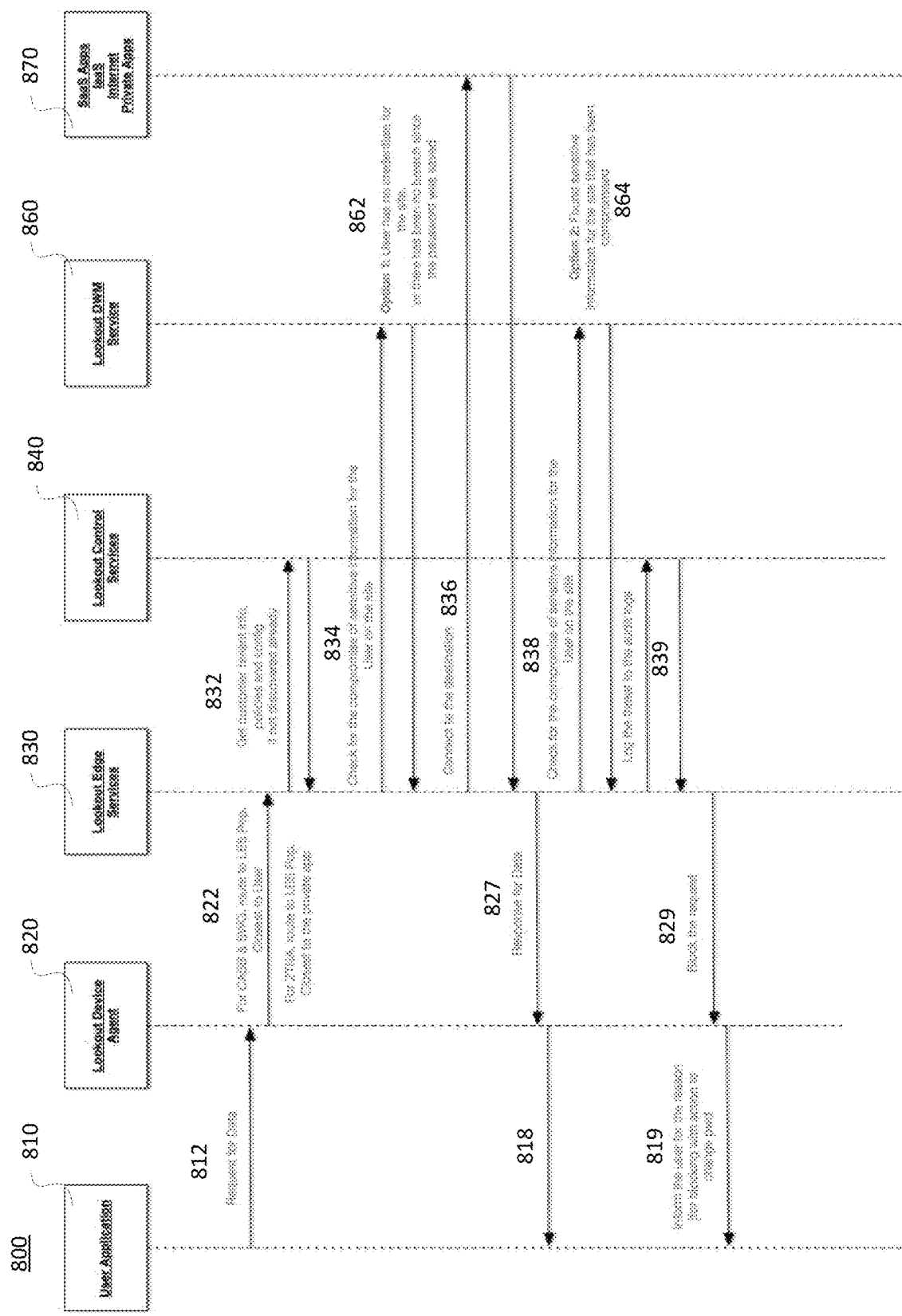
FIG. 8 illustrates a block diagram of a system for a server-side control application providing real-time monitoring and alerting of breached security credentials for web sites integrated with a DNS server in accordance with some embodiments.
Figure 9:
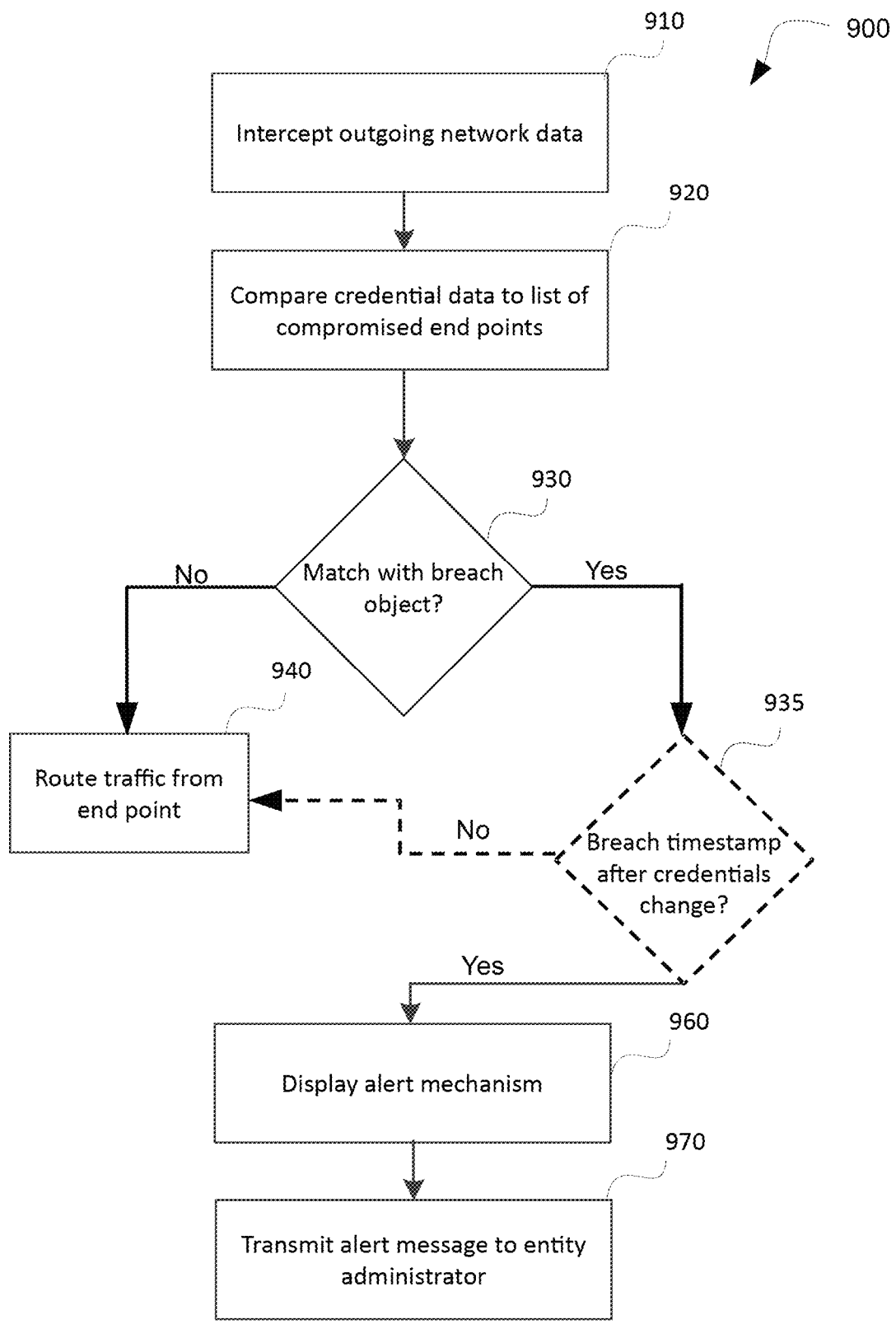
FIG. 9 illustrates a flow diagram of an example method of entity-side actions and remedies in the event of a potential breach of user credentials in accordance with some embodiments.

While the embodiments shown in FIGS. 3-7 describe use of a security client module to perform the monitoring and alerting of potentially breached user credentials, these features may be performed using a server-side application in other embodiments using a breach monitoring component executing on a server. FIG. 8 illustrates a block diagram of a system 800 for a server-side breach monitoring component providing real-time monitoring and alerting of breached security credentials for web sites integrated with a DNS server in accordance with some embodiments. FIG. 9 illustrates a flow diagram of an example method 800 of providing server-side real-time monitoring and alerting of breached security credentials in accordance with some embodiments. Method 900 may be implemented using system 800, and exemplary components of system 800 performing the steps of method 900 are described herein.

In system 800, a client device application 810 (which may be a browser application or a dedicated application directed towards a specified server-based endpoint) may request endpoint data 812. At step 910 of method 900, the cloud server 830 receives intercepted outgoing network traffic from the client device that includes a request for web site data and a reference to user credentials. This may be done using software agent 820, also executing on the client device, to route the request via 822, along with all other client device network traffic, to cloud server 830 for further analysis. The mechanism to perform the routing may depend on the nature of the cloud-based application for monitoring and alerting of breached security credentials. In embodiments using a cloud access security broker or a software gateway to intercept the network traffic, a server 830 executing a breach monitoring component (e.g., an application or security plug-in or software component) located closest to the client device may be selected for network traffic 822. For a zero trust network access application, the cloud server 830 executing the breach monitoring component may be selected based on being closest to the private application. Also, in response to receiving and identifying the request for endpoint data, the server 830 executing the breach monitoring component may request and retrieve customer tenant information associated with the client device 832 if not previously retrieved from client control services application 840. The customer tenant information 832 may include policies and configurations for the client device.

Credential data for the requested endpoint and/or the endpoint associated with the credentials may be compared to credential data linked to a list of compromised endpoints at step 920 by the server 830 executing the breach monitoring component using the list received from dark web monitoring service 860 in response receiving the request for endpoint data 822. When no match is identified, or when the endpoint associated with the credentials in question may be identified as not being associated with a compromised endpoint based on the data received from the dark web monitoring service 860 at determination 862, the breach monitoring component 830 may connect to the destination endpoint 870 at 836. The destination endpoint 870 may be any server-based endpoint, including a software as a service web application, a web site, and/or a private application URL. The response 838 may be routed by breach monitoring component 830 as data response 827 to software agent 820 at step 940, which may then be rendered for display of the client device as response data 818 to the requesting application 810

Alternatively, the credential data for the requested endpoint and/or the endpoint associated with the credentials may match credential data linked to a breach object on the list of compromised endpoints when compared at 838. After the determination 864 by the server executing breach monitoring component 830 that the credential data for the requested endpoint and/or the endpoint associated with the credentials matches the credential data linked to the breach object, the breach monitoring component 830 may log the thread to the credentials in the credential data 839 with the client control services application 840. Furthermore, the cloud server application 830 may block the request at 829. In response to the blocking 829 of the request for the endpoint associated with the credentials from the credential data 822, the software agent 820 may provide the client device with change credentials mechanism 819. The change credentials mechanism 819 may assist a user with changing the credentials for the compromised endpoint. The assistance may include, for example, informing the user the reason that the request was blocked, and/or providing the user an opportunity to change the credentials (e.g., a password change form or link).

In some embodiments, a timestamp for the time the breach was detected (received via a breach object from dark web monitoring service 860 by the breach monitoring component 830) may optionally be compared to a timestamp corresponding to the most recent previous user credentials change was made for the compromised endpoint at block 935. When the timestamp for the most recent previous user credentials change is after the breach timestamp, then the credentials are determined not to be at risk and the response may be routed from the endpoint at block 940. In response to the timestamp comparison indicating that the breach time field of the breach object has taken place after the most recent previous credentials change associated with the breached web site, the breach monitoring component 830 may block traffic 829 to or from the requested endpoint until the credentials are changed.

An alert mechanism may then be caused to be displayed on a display of the client device by the server 830 executing the breach monitoring component at step 960 in response to the timestamp comparison indicating that the breach time field of the breach object has taken place after the most recent previous credentials change associated with the breached web site. After receiving the alert, the software agent 820 may, in addition to displaying the alert interface, take the user to a change user credential web site. In addition to the alert mechanism being displayed on the client device, an alert mechanism may also be transmitted to an entity administrator (e.g., a user associated with maintaining the server 830 executing the breach monitoring component) at step 970. Notifying the entity administrator that the client computing device has compromised user credentials can allow for additional measures to be taken in response to a detected breach, including quarantining all traffic from the client device via software agent 820, blocking traffic to a specific set of sites (for example, a corporate network affiliated with the breached web site), and the like.

While the embodiments have been described with regards to particular embodiments, it is recognized that additional variations may be devised without departing from the inventive concept. The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

The invention claimed is:

1. A method comprising:
    identifying, by a software component executing on a computing device, credential data being transmitted to a server-based endpoint, the software component intercepting outgoing network traffic from the computing device, the credential data having a classification being selected from a site password type, a personal information type, and a financial information type;
    comparing, by the software component, the credential data to credential data linked to a list of compromised server-based endpoints;
    causing, by the software component, an alert mechanism to be displayed on a display in response to a match being identified between the credential data and credential data of a breach object on the list of compromised server-based endpoints; and
    identifying a web page or an application, based on the classification of the credential data, that receives changes of credentials for the server-based endpoint.

2. The method of claim 1, the alert mechanism being caused to be displayed in response to both the match with the breach object and further in response to a timestamp comparison indicating that a breach time field of the breach object is after a previous credentials change associated with the server-based endpoint.

3. The method of claim 2, the comparing the credential data to the credential data linked to the list of compromised endpoints further comprising:
    comparing network-based destinations of the outgoing network traffic to the list of compromised endpoints; and
    when the outgoing network traffic includes data directed towards an endpoint referenced in the breach object on the list of compromised endpoints:
        identifying a timestamp of the previous credentials change for the endpoint referenced in the breach object; and
        comparing the timestamp of the previous credentials change to the breach time field, a password change interface being requested by the software component in response to the timestamp of the previous credentials change indicating an earlier time than the breach time field.

4. The method of claim 3, further comprising updating the timestamp of the previous credentials change in response to receiving an outgoing change of password via a change credentials mechanism.

5. The method of claim 1, further comprising causing, by the software component, a change password interface to be displayed, the change password interface including fields that receive at least one of inputs for the user to change the user credentials or a file containing updated credential data before relaying the credential data to the server-based endpoint.

6. The method of claim 5, the change password interface being caused to be conveyed for subsequent visits to any server-based endpoint having a previous credentials change prior to the breach time field value.

7. The method of claim 5, the change credentials interface being a credential change monitoring service interface that separately transmits credentials changes to the server-based endpoint.

8. The method of claim 1, wherein the software component utilizes one of a loopback virtual private network (VPN), a transport layer security (TLS) certificate, or a domain name system (DNS) resolution system to intercept the outgoing network traffic.

9. The method of claim 1, further comprising, receiving, from a dark web monitor or other source of potentially compromised credentials, the list of compromised endpoints.

10. The method of claim 1, the alert mechanism being caused to be displayed in response to both the match with the breach object and further in response to a received indication from a mechanism displayed in response to the match with the breach object, the received indication being that credentials for the requested server-based endpoint have not been updated after a breach time value of the breach object.

11. A method comprising:
receiving, by a breach monitoring component executing on a server, a request for a server-based endpoint data;
identifying, by the breach monitoring component, that the request includes user credentials for the server-based endpoint;
comparing, by the breach monitoring component, the user credentials to credential data linked to a list of compromised server-based endpoints;
causing, by a device notification service in communication with the breach monitoring component, an alert interface to be displayed on a display in response to both (1) the comparing the user credentials resulting in a match with credential data of a breach object on the list of compromised server-based endpoints and (2) a timestamp comparison indicating that a breach time field of the breach object is after a previous credentials change associated with the server-based endpoint; and
blocking, by a domain name system server in communication with the breach monitoring component, access to the server-based endpoint in response to receiving a separate notification from the breach monitoring component when both (1) the comparing the user credentials results in a match with credential data of a breach object on the list of compromised server-based endpoints and (2) the timestamp comparison indicates that the breach time field of the breach object is after the previous credentials change associated with the server-based endpoint.

12. The method of claim 11, where the request is received from a domain name system server that received the request from a client device.

13. A method comprising:
identifying, by a software component executing on a computing device, credential data included in a transmission to a server-based endpoint, the credential data including user credentials, the software component intercepting outgoing network traffic from the computing device;
comparing, by the software component, the user credentials to credential data linked to a list of compromised server-based endpoints;
causing, by the software component, an alert interface to be displayed on a display and causing access to the server-based endpoint to be blocked in response to both (1) the comparing the user credentials resulting in a match with credential data of a breach object on the list of compromised server-based endpoints and (2) a timestamp comparison indicating that a breach time field of the breach object is after a previous credentials change associated with the server-based endpoint; and
transmitting, by the software component, an alert interface stating that the computing device has compromised user credentials to a device associated with an entity administrator.

14. The method of claim 13, further comprising blocking, by the software component, access to the server-based endpoint in response to receiving a subsequent request for data from the server-based endpoint after the alert interface has been displayed.

15. The method of claim 14, further comprising permitting, by the software component, access to the server-based endpoint in response to receiving a change in the user credentials after the blocking access to the server-based endpoint.

16. The method of claim 13, further comprising blocking, by the software component, access to a list of web sites in response to receiving a subsequent request for data from any web sites on the list of web sites after the alert interface has been displayed.

17. The method of claim 13, further comprising providing, by the software component, a list of web sites where the user credentials have been previously used in response to both (1) the comparing the user credentials resulting in the match with credential data of the breach object on the list of breached user confidential information and (2) the timestamp comparison indicating that the breach time field of the breach object is after the previous credentials change associated with the server-based endpoint.

* * * * *